United States Patent [19]

Mandai et al.

[11] 4,312,059

[45] Jan. 19, 1982

[54] ELECTRONIC TIMEPIECE

[75] Inventors: Masaaki Mandai; Akira Torisawa; Makoto Ueda; Kazuhiro Asano; Masaharu Shida; Katsuhiko Satoh, all of Tokyo, Japan

[73] Assignee: Kabushiki Kaisha Daini Seikosha, Tokyo, Japan

[21] Appl. No.: 898,439

[22] Filed: Apr. 20, 1978

[30] Foreign Application Priority Data

Apr. 23, 1977 [JP] Japan .................................. 52-47088

[51] Int. Cl.³ ..................... G04F 5/00; G04C 19/00; G05B 19/40
[52] U.S. Cl. ..................................... 368/157; 368/85; 368/217; 318/696
[58] Field of Search ............. 58/23 A, 23 D, 23 BA, 58/23 R, 152 H; 340/373, 636, 663, 672; 318/696, 685; 368/28, 76, 155–157, 85, 86, 203, 204, 217–218

[56] References Cited

U.S. PATENT DOCUMENTS

| 3,662,245 | 5/1972 | Newell | 318/696 |
| 3,855,781 | 12/1974 | Chihara et al. | 58/4 A |
| 4,032,827 | 6/1977 | Dobrate | 318/696 |
| 4,114,364 | 9/1978 | Takahashi | 58/23 D |
| 4,212,156 | 7/1980 | Kawamura et al. | 368/217 |

*Primary Examiner*—Vit W. Miska
*Attorney, Agent, or Firm*—Robert E. Burns; Emmanuel J. Lobato; Bruce L. Adams

[57] ABSTRACT

In an electronic timepiece, a motor is driven by a pulse having a shorter pulse width than the conventional driving pulse and afterwards, a detection pulse is applied to the motor coil so as to determine rotation of the rotor. If the rotor fails to rotate a correction is effected by driving the motor by a pulse having a pulse width greater than the normal driving pulse.

22 Claims, 11 Drawing Figures

MOTOR CONTROL CIRCUIT

ELECTRONIC TIMEPIECE

BACKGROUND OF THE INVENTION

The present invention relates to an improvement of an electronic watch in which power consumption of a stepping motor can be reduced.

The present invention will be explained in connection with embodiment of the present invention applied to an analog type electronic watch.

DESCRIPTION OF THE PREFERRED EMBODIMENT

Figure 1:
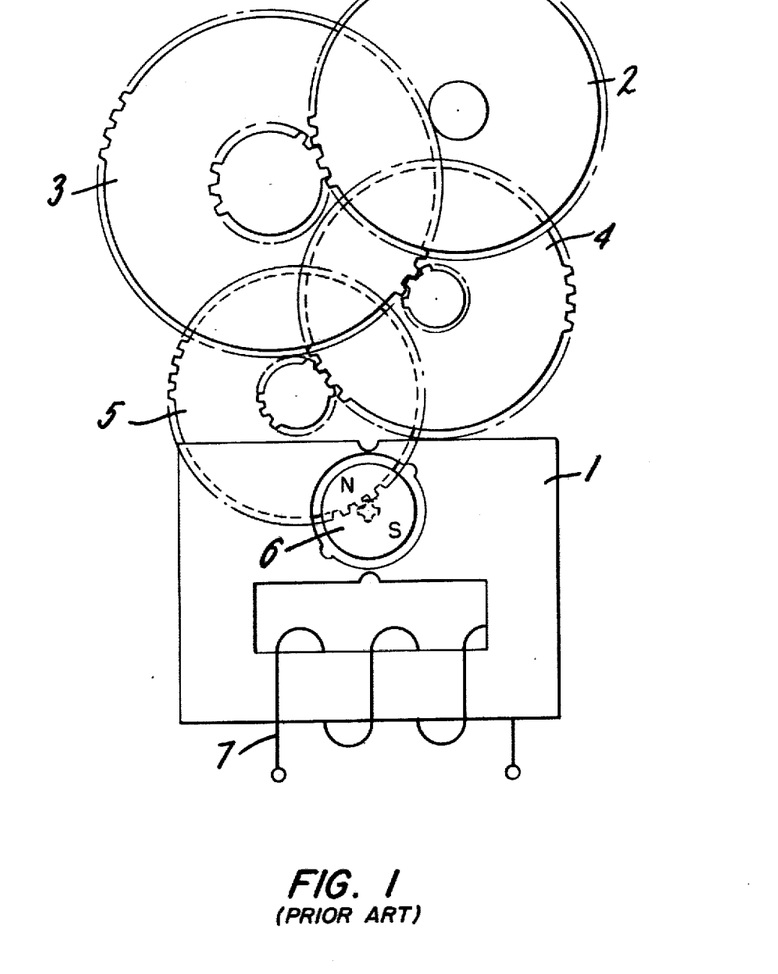
FIG. 1 shows a display mechanism of an analogue type crystal watch.

The display mechanism of an analog type crystal watch heretofore used is generally constructed as shown in FIG. 1. The output of a motor comprised of a stator 1, a coil 7, and a rotor 6 is transmitted to a fifth wheel 5, a forth wheel 4, a third wheel 3, and a second wheel 2. Although not shown, the output is then transmitted to a cylindrical member, a cylindrical wheel, and a calendar mechanism, and a second hand, a minute hand, an hour hand and a calendar are driven.

In the case of a wrist watch, a load seen from a stepping motor is extremely small except for the time for switching the calendar, so that a torque of 10 g/cm in the second wheel is enough for driving the watch mechanism. However, when switching the calendar, a torque of several time higher than this is required. The time required for switching the calendar with twenty-four hours operation, for one day is only at most about six hours. However, for the reasons described above in the mechanism according to the prior art, there is a problem in that electric power which enables the calendar driving mechanism to be operated in a stable condition must always be supplied from a power supply of the watch.

Figure 2:
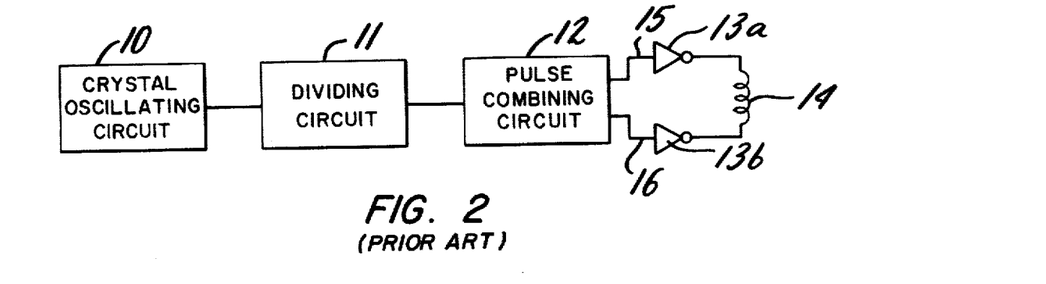
FIG. 2 shows a circuit construction of an electronic watch.
Figure 3:
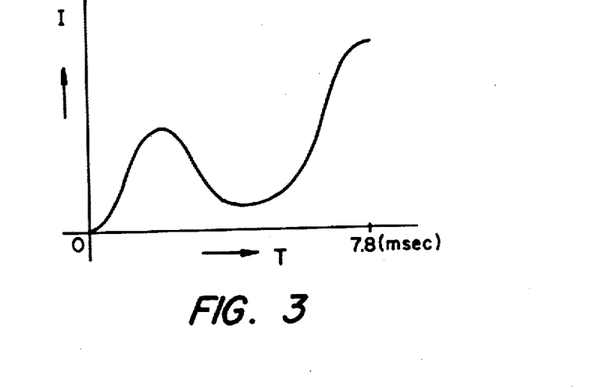
FIG. 3 shows a current waveform of the conventional stepping motor.

FIG. 2 shows an electronic watch circuit construction according to the prior art. The signal of 32.768 KHZ from an oscillator circuit 10 is converted to a one second signal by a frequency dividing circuit. The one second signal is converted to a signal having 8 ms pulse width by a pulse combining circuit 12, thus a signal pair having the same period and pulse width but being dephased by one second are applied to the inputs 15 and 16 of inverters 13a and 13b. As a result, an alternating pulse which changes the direction of the coil current is applied to a coil 14 every one second, so that the rotor 6 magnetized in two poles rotates in one direction. FIG. 3 shows the coil current waveform. In this manner, the drive pulse width of the present day electronic watch is set to supply the required maximum torque as its standard. Therefore, in the time interval which does not require a large torque, electric power is wasted. This has prevented achieving lower power consumption of the watch.

In order to overcome these defects, in the electronic watch according to the present invention, a motor is driven by a pulse having a shorter pulse width than the conventional driving pulse, and afterwards a detection pulse is applied to the motor coil so as to determine rotation of the rotor, and the rotation of the rotor is detected by a voltage level across a resistor connected in series to the coil. If the rotor fails to rotate a correction is effected by driving the motor by a pulse having a pulse width which is greater than the normal driving pulse.

Figure 4:
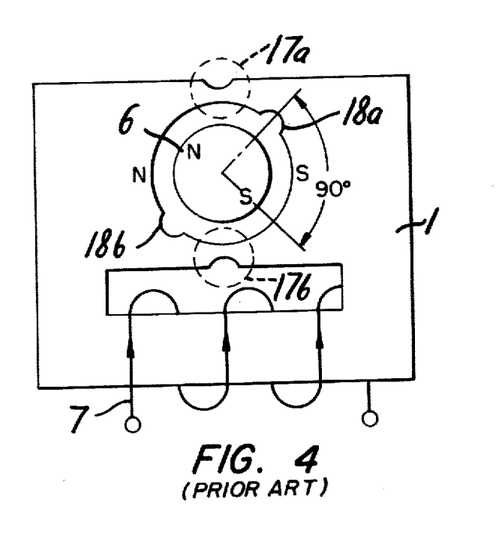
FIGS. 4, 5 and 6 show the operation of the stepping motor.

The principle of the rotation of a stepping motor for use in the electronic watch according to the present invention is as follows:

Referring to FIG. 4, numeral 1 shows a stator constructed in one integral body having a magnetic path or circuit 17 which is easily saturable. The stator is magnetically coupled with a magnetic core having a coil 7. In order to determine the direction of the rotation of the rotor 6 with two magnetic poles provided in the direction of the rotor diameter, a notch 18 is provided in a pole face of the stator. In FIG. 4, the condition is shown in which electric current has just been applied to the coil 7. When no current is applied to the coil 7, the rotor 6 remains stationary at the position defining a 90 degree angle between the notch 18 and the magnetic poles of the rotor. In this condition, when the current flows through the coil 7 in the direction of the arrow mark, the magnetic poles are produced in the stator 1 as shown in FIG. 4, so that the rotor 6 rotates in the clockwise direction due to repulsion between the rotor and stator poles. When the current flowing through the coil 7 is interrupted, the rotor 6 will remain stationary with the rotor poles reversed relative to the previous condition illustrated in FIG. 4. Afterwards, the rotor 7 keeps sequentially rotating in the clockwise direction in response to the current pulses which alternate in polarity.

Since the stepping motor stator used in the electronic watch according to the present invention is constructed in one integral body having saturable portion 17 (or saturable portions 17a, 17b), the current waveform flowing through the coil 7 presents a characteristic with the slow rising curve as shown in FIG. 3. The reason for this is that before the saturable portion 17 of the stator 1 is saturated the magnetic resistance of the magnetic circuit seen from coil 7 is very small, so that the time constant "τ" of the series circuit of the resistor and the coil becomes very large. The equation of this condition can be expressed as follows:

$$\tau = L/R, \quad L \doteq N^2/Rm$$

Therefore, the following equation is established $$\tau = N^2/(R \times Rm)$$

Where "L" denotes the inductance of the coil 7, N is the number of turns of the coil 7, Rm is magnetic resistance.

When the saturable portion 17 of the stator 1 is saturated, the permeability of the portion becomes the same as that of air. Accordingly, the value of Rm increases and the time constant "τ" of the circuit becomes small and the waveform of the current rises abruptly as shown in FIG. 3.

According to the present invention, the detection of the rotation or non-rotation of the rotor 6 of a stepping motor for use in the electronic wrist watch is achieved by detecting the difference of the time constant of the circuit consisting of the resistor and motor coil connected in series. The reason for the difference of the time constants will now be explained.

Figure 5:
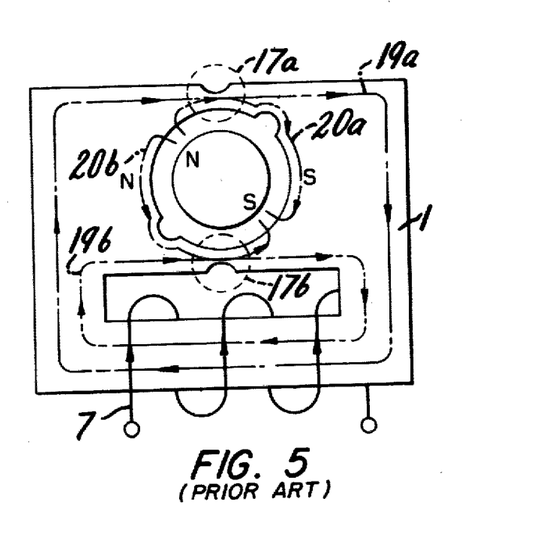

FIG. 5 shows a magnetic field at the time the current flows through the coil 7. In the figure, the rotor 6 is in the position which is rotatable, as determined by its position relative to the stator magnetic poles. The magnetic flux 20 is the one which is derived from the rotor 6. A magnetic flux which intersects the coil 7 also exists in practice, however, that flux is neglected here. The magnetic fluxes 20a and 20b are shown as being derived from the saturable portions 17a and 17b of the stator 1 and they are directed in the arrow directions. The saturable portion 17 is, in most cases, not in the saturated condition.

Figure 7:
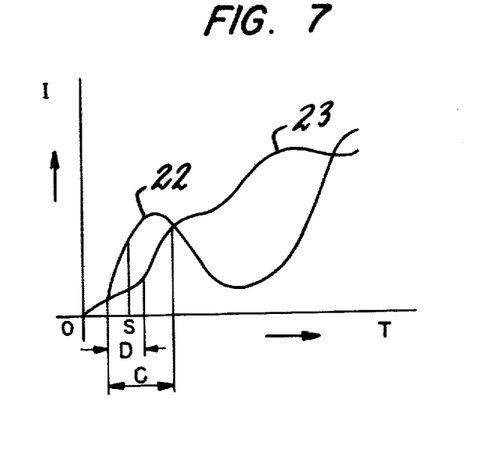
FIG. 7 shows the current waveforms of the rotor when it is normally rotated and when it is not rotated.

In this condition, the current flows in the direction of the arrow mark of the coil 7 so as to rotate the rotor 6 clockwise. The magnetic fluxes 19a and 19b produced by the coil 7 are added to the magnetic fluxes 20a and 20b produced by the rotor 6 within the saturable portions 17a and 17b, so that the portion 17 of the stator 1 rapidly saturates. Afterwards, a magnetic flux which is sufficient for rotating the rotor 6 is produced. However, this is omitted in FIG. 5. FIG. 7 shows the waveform of the current flown through the coil as numeral 22.

Figure 6:
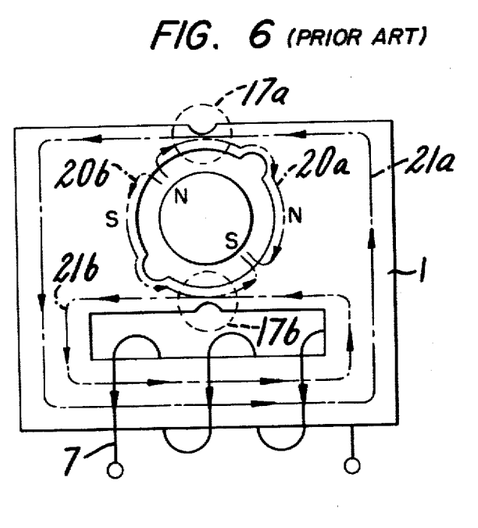

FIG. 6 shows the condition of the magnetic flux in which the current flows through the coil 7 at the time when the rotor 6 could not be rotated for some reason and has returned to the original position. Generally, in order to rotate the rotor 6, the current must flow in the coil 7 in the opposite direction as the illustrated arrow, i.e. in the same direction as that shown in FIG. 5. However, in this case since an alternating inverted current is applied to the coil 7 for every rotation, this condition occurs whenever the rotor 6 could not be rotated. Since the rotor 6 could not be rotated in this case, the direction of the magnetic flux from the rotor 6 is the same as the one shown in FIG. 5.

In this case, since the current flows in the opposite direction as shown FIG. 5, the direction of the magnetic fluxes become as illustrated by the flux lines 21a and 21b. In the saturable portions 17a and 17b, the magnetic fluxes produced respectively from rotor 6 and the coil 7 cancel each other, so that in order to saturate the portion 17 of the stator 1, a longer time is required. FIG. 7 shows this condition as numeral 23. In this embodiment, the time interval "D" before the portion 17 of the station 1 saturates in FIG. 7 was B 1 m sec. for the ease in which the diameter of the coil is 0.23, the number of turns is 10,000, the coil series resistance is 3 kΩ, the diameter of the rotor is 1.3 and the minimum width of the saturable portion is 0.1. As is apparent from the waveforms 22 and 23 of the two currents in FIG. 7, the inductance of the coil is small when the rotor 6 is rotating within the range of C in FIG. 7 while it is large at the time of non-rotation. In the stepping motor as described above, the equivalent inductance in the range of "D" was chosen as L=5 henry at the current waveform of 22 when rotating, and was chosen as L=40 henry at the waveform 23 during non-rotation. For instance, when the resistor "r", which is a passive element and which is provided for rotation detection, and the coil series resistor "R" are conneted in series to the inductance through the power supply "VD", the change in inductance is easily detected by the voltage appearing across the resistor element. The voltage across the resistor element is applied to an MOS inverter having a threshold value "Wth", i.e. ½ Vn voltage. From the fact that the voltage across the resistor "r" is ½ Vn, the following equation is obtained:

$$(\tfrac{1}{2})VD = r/(R+r) \cdot [1 - \mathrm{Exp}\{-(R+r)\cdot t/L\}]$$

In this equation, when R=5 KΩ, t=1 m sec, L=4 henry, the "r" becomes 29 KΩ. Moreover, in the case of the value of current waveform 22 in FIG. 7, the saturation time is approximately 0.4 m sec. Therefore, calculating the equation with R=3 KΩ, t=0.6 m sec, L=5 henry, the resistor "r" is 7.1 KΩ. This means that the range of the detecting resistor element for which detection can be achieved falls between 7.1 KΩ to 29 KΩ. This result coincides with the result of experiment. In the embodiment according to the present invention, the resistor element is used as a detecting element. However, it is also possible for the detecting to be a passive element such as a coil, capacitor or an active element such as a MOS transistor.

As is apparent from the above description, rotation or non-rotation of the rotor 6 is determined by applying a detection signal to determine whether the rotor has rotated. That makes it possible to drive the rotor with a normal drive low torque by applying a pulse with a short width, as well as to correct the driving with high torque developed by a pulse with a long width for the condition that non-rotation of the rotor is detected.

However, it is not so sufficient to always accurately drive a stepping motor from stand point of magnetic proof.

Referring now to a magneticproof characteristic, i.e. and upper value of outer magnetic field in where a stepping motor is normally rotated when said stepping motor is located in a certain magnetic field:

Factors for determining a magneticproof quality of a stepping motor are as follows;

(1) A magnetic saturation value of a motor coil core.
(2) A mis-rotation or location of the rotor, i.e. an overrunning or a backing condition.

As to the first factor (1), it is determined by a cross sectional area of a core of the stepping motor, a core material, a core shape, i.e. the design specifications of the stepping motor, whereby an operating irregularity is very small and operating stability is obtained when the magnetic proof quality is completely determined by the first factor (1). However, as to the second factor (2), it is not so simple as the first factor (1).

When a magnetic field is applied to a stepping motor from outside, the magnetic field is applied to the motor stator in a certain direction if a current is not applied to the coil of the motor, whereby a time for saturating a saturation magnetic path of the motor stator and a condition for rotation of the rotor are changed. Consequently, driving pulse polarity, timing of pulse termination and rotation conditions are different than in the absence of an external magnetic field.

Therefore, a rotor must stay in a certain location with a decreased vibration after one step of rotation, however, the rotor has a surplus kinetic energy after termination of a motor driving pulse, whereby the rotor frequently runs toward the next stationary location or backs toward its previous stationary location.

Therefore, if a magneticproof characteristic of a stepping motor is determined by the second factor (2), the factors of shape and magnetic characteristic of the stator, resistance and number of turns of the coil and a magnetic coupling condition of the stator and the coil are complicated. As a consequence, any operating irregularity becomes larger, quality becomes worse, and the level of a magnetic proof chracteristic decreases substantially.

According to the above noted description, it is desired that a motor driving pulse be terminated after a surplus kinetic energy of the rotor has been consumed. Therefore, if a magneticproof characteristic is poor, because of the second factor, (2) for a pulse width "A", a magneticproof characteristic becomes better for a longer pulse width "B" since the magneticproof characteristic is then not determined by the second factor (2).

Further, if a pulse width for obtaining a maximum efficiency of a stepping motor is selected as a correction drive pulse, a magneticproof characteristic at this time may be determined by the second factor (2). Therefore, the rotor may not be rotated when a magnetic field is applied to the stepping motor from outside of the stepping motor. In case of driving the motor by a correction drive pulse when the rotor is not rotated by a normal pulse, a detection pulse is thereafter applied to determine whether or not the rotor has rotated normally in response to the correction drive pulse. In case non-rotation of the rotor is determined, and if a second correction drive pulse having a longer pulse width (i.e., greater effective power) is applied to the motor, the rotor is rotated and it is able to insure a good magneticproof characteristic. An operating mode of sequentially applying a correction drive pulse to the motor as above described is very useful for developing a magneticproof characteristic, and it is also able to obtain a motor of low power requirement by selecting a pulse in which a torque becomes higher from first step to a next step.

Furthermore, an important feature of the detecting portion of the electronic watch according to the present invention resides in its circuit structure enabling the detection of inductance change without using other amplifiers than those of the timepiece driving circuit. In FIG. 7, there is shown a very simple method for realizing detection of inductance change in which a D.C. resistor, the value of which is nearly the same as that of the coil 7 or larger than the coil resistance, is temporally inserted in series with the coil 7 so as to develop a voltage across the resistor which is determined by the voltage dividing ratio of the inductance of the coil 7 and the resistor.

Figure 8:
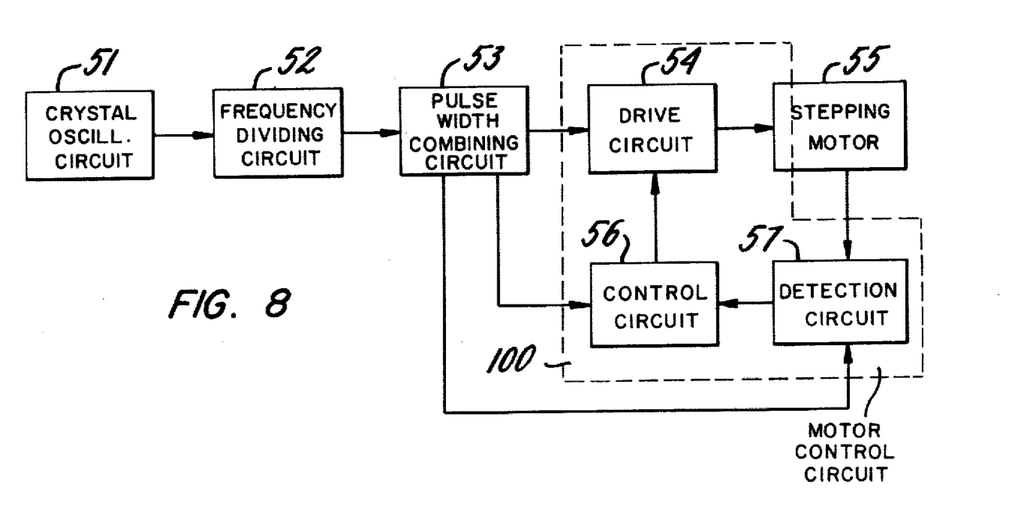
FIG. 8 shows an overall block diagram of one embodiment of the electronic watch according to the present invention.

FIG. 8 shows in block diagram form the major components of an electronic watch. A crystal oscillating circuit 51 generates an oscillating signal which is used as a time standard signal of the watch. A frequency dividing circuit 52 is constructed by a multi-stage flip-flop circuit which can divide down to one second for generating an oscillating signal required for operating the watch circuit. A pulse width combining circuit 53 combines output signals from each flip-flop output of the frequency dividing circuit and developes a normal drive pulse signal with the pulse width necessary for driving a stepping motor, a drive pulse signal for the correcting drive, a detection pulse signal with a duration necessary for rotation detection, a time interval setting signal between the normal drive pulse and the detecting pulse, and a time interval setting signal between the detecting pulse and the correcting drive pulse, etc.

A drive circuit 54 supplies the normal drive pulse, the detecting pulse, or the correcting drive pulse as an inverted pulse to the stepping motor.

A rotor of a stepping motor 55 is rotated with a small torque by said normal drive pulse. Rotation and non-rotation of said rotor is detected by detecting a difference of inductance of a coil according to the rotation and non-rotation of said rotor by applying a detection signal to a detection circuit 57. Therefore, in case the rotor is not rotated in response to an applied normal drive pulse, a correction drive operation is executed by applying a broader correction drive pulse to the drive circuit 54 from a control circuit 56 after non-rotation of the rotor is detected. Then, a detection pulse is applied and, in case non-rotation is detected, a second longer correction drive pulse is applied to the drive circuit for application to the stepping motor. The above noted operation is sequentially executed until said rotor is exactly normally rotated. In the above noted embodiment of the present invention, a direction or polarity of a detection pulse is set in the same direction or polarity as a drive pulse just before it is to be applied, i.e. the present invention is able to reverse said direction of the detection pulse.

Figure 9:
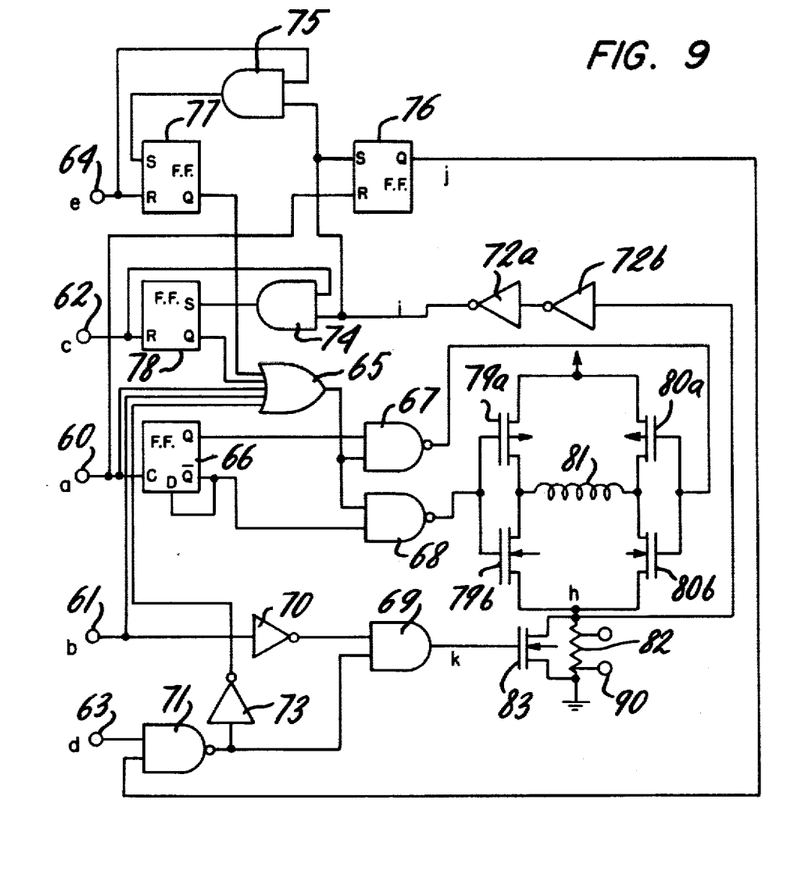
FIG. 9 shows circuit structure of the invention including a drive circuit, a control circuit and a detection circuit.

A pulse width combining circuit 53 uses 1 m sec., 3.9 m sec., 7.8 m sec., 15.6 m sec., 31.2 m sec. and 62.5 m sec. pulses which are divided from the output signal of the quartz oscillation circuit 51 which oscillates at 32.768 KHZ. The detailed construction of the oscillation circuit is omitted. FIG. 9 shows an embodiment of a motor control circuit 100.

The drive circuit 54 is composed of NAND-gates 67 and 68, a flip-flop 66 and drive inverters 79a, 79b, 80a and 80b. The motor 55 is composed of a coil 81. The detection circuit 57 is composed of inverters 70, 72a, 72b, 73, AND-gate 69, 74 and 75, NAND-gate 71, R-S flip-flop 76, N-channel MOSFET 83 which operates as a switching element and a resistor element 82. Said control circuit 56 is composed of flip-flop 77 and 78 and OR-gate 65.

Figure 10:
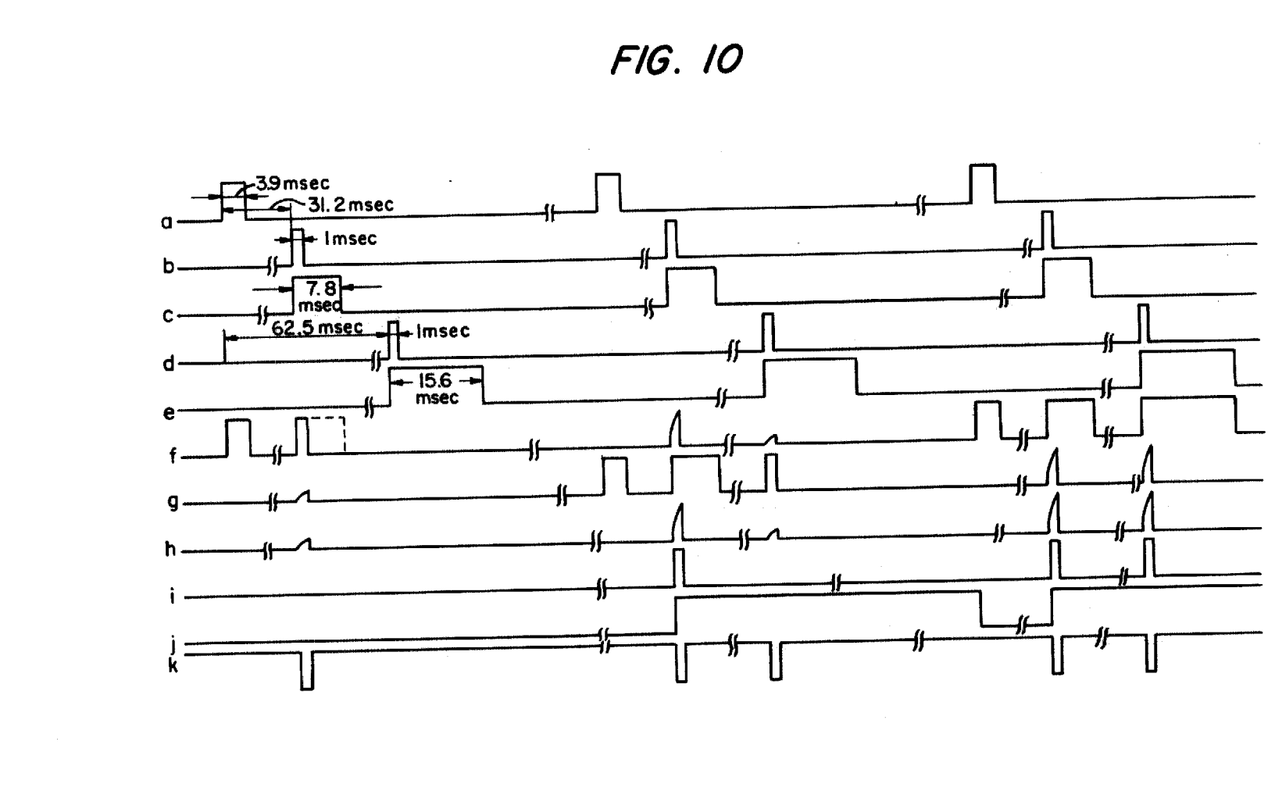
FIG. 10 shows a timing chart of the circuit shown in FIG. 1.
Figure 11:
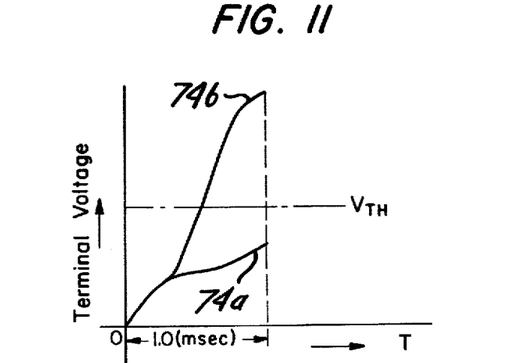
FIG. 11 shows a voltage waveform of a detection terminal.

FIG. 10 shows a time chart of signal waveforms developed at various points of circuit of FIG. 9. The timing of a normal drive pulse, detection pulse, correction drive pulse, second detection pulse and second correction drive pulse, which are applied to the terminals 60, 61, 62, 63 and 64, respectively is shown in FIG. 10. First of all, when the normal drive pulse is applied to the terminal 60, the output of D type flip-flop 66 is inverted, and further the normal drive pulse signal applied to the D type flip-flop passes through the OR-gate 65. An output of one of the NAND-gates 67 and 68 becomes "1", and if the output of said NAND-gate 68 became "1", a current flows to VD, P-channel MOSFET 79b, N-channel MOSfet 83 and VS. Afterwards, when a detection pulse is applied to said terminal 61, the signal of said detection pulse does not pass said flip-flop 66 whereby the output of said NAND-gate 68 becomes "1" and a current flows to said coil through the circuit path previously described. In this case, a gate voltage of N-channel MOSFET 83 is maintained "1", i.e. MOSFET 83 is maintained in the OFF condition, whereby a current flows to VS through the resistor element 82. A current waveform, at this time, is different than when the MOSFET is conductive since said resistor 82 is inserted in series with said coil 81, however the two current waveforms initially are almost equal. Therefore, it is possible to detect the rotation or non-rotation of the rotor by determining the value of the coil inductance, i.e. by detecting a voltage of node "h" which depends on the coil inductance. If a voltage of node "h" is lower than the threshold level of an inverter 72b, said rotor is judged to have been rotated by a normal drive pulse, whereby an output of an inverter 72b becomes "0", and the circuit does not carry any further operating steps. On the contrary, if the voltage of node "h" is higher than the threshold level of said inverter 72b, said rotor is judged to not have been rotated by a normal drive pulse, whereby an output of said inverter 72a becomes "1", an output of AND-gate 74 becomes "1", R-S flip-flop 78 is set, and R-S flip-flop 76 is set.

An output "Q" of the flip-flop 78 becomes "1", and remains "1" until a reset pulse from a terminal 62 is downed, when thte flip-flop 78 is set, whereby an output of NAND-gate 68 becomes "1" through OR-gate 65 since an output of the flip-flop 66 is not reversed, and a current flows to the coil 81 and said rotor is driven.

Further, when a second detection pulse is applied to the terminal 63, an output of NAND-gate 71 becomes "0" since R-S flip-flop 76 was set and the output "Q" of flip-flop 76 became "1", whereby a signal "1" is applied to the OR-gate 65 through the inverter 73, and the output of AND-gate 69 becomes "0" without relation to another input. At this time, an output of D typed flip-flop 66 is not reversed, whereby an output of NAND-gate 68 becomes "1", a current flows to VD, P-channel MOSFET 80a, coil 81, N-channel MOSFET 79b, resistor 82 and VS (N-channel MOSFET 83 is maintained in the OFF condition). At this time, if the rotor is not rotated, an output of the inverter 72a becomes "1", R-S flip-flop 77 is set, the output "Q" is maintained at "1" until a reset pulse of the terminal 64 is downed, and the rotor is rotated by applying a current to the coil 81 through the same conductive path previously described. When an output of the inverter 72a became "1" in response to a second detection pulse, an output of the AND-gate 74 remains at "0" since the terminal 62 is maintained at "0", whereby R-S flip-flop 78 is not changed. Subsequently R-S flip-flop 76 is reset by a next normal drive pulse and maintained in a standby condition. The circuit illustrated in FIG. 9 is operated by repeating the described sequence of steps for driving the stepping motor in a stepping mode.

In the embodiment according to the present invention, both resistor 82 and N-channel MOSFET 83 are used as a passive element for a current detection element and a switching element, respectively.

However, it is also possible to use an MOS transistor as an active element for the current detection element. In this case, the resistor element 82 shown in FIG. 9 can be omitted by selecting the ON resistance of the MOS transistor to be nearly zero, while the OF resistance of the same to be about 15 KΩ.

As described in the foregoing, in the method according to the present invention, since the rotation or non-rotation of the rotor is discriminated from the current or the voltage characteristic of the stepping motor by applying the detection pulse to the motor coil, it is possible to detect the rotor condition without changing the existing stepping motor. Therefore, a corrective drive can be carried out by a higher power correction drive pulse than that required for the normal load, in response to the non-rotation signal, to insure that the watchh operates even under the most unfavorable conditions. And the normal drive pulse is less than that required to drive the watch under the most unfavorable conditions. By this method, the watch never stops operation even if the most unfavorable power consumption continues, as when the power necessary for driving by the corrective drive pulse is added to the normal drive power. As shown in FIG. 10, the normal drive pulses (waveform a) have the smallest pulse width and the plurality of correction drive pulses (waveforms c and e) have successively longer pulse widths (waveforms c and e) have successively longer pulse widths (greater effective powers).

As compared with the conventional system, in this embodiment according to the present invention, the power consumption can be retained at about 60%, thus yielding a striking improvement. Still, when the saturating time difference of the magnetic circuit of the stepping motor stator constructed as one body should be detected, all switching elements in the circuit are constructed by switching elements except for one resistor element. The value of this resistor ranges between 7.1 KΩ to 29 KΩ in this embodiment according to the present invention and the resistor elements can be integrated in the IC circuit. Therefore, additional parts for controlling the pulse width can be dispensed with which renders the present invention economical. Furthermore, it is possible that the circuit can be utilized for the correction of the discrepancies between resistors due to the differencies in IC fabrication processes as well as for different applications of IC type motors.

According to the present invention, all of the circuits can be assembled in an integrated circuit when the active element is used as a detecting element. The purpose of the invention can be attained by the construction shown in FIG. 9.

Moreover, since the threshold value Vth is always a half of the power supply because of the use of a C-MOS logic element as a binary logic element for the detecting circuit, the detection circuit is not subjected to the power supply. This eliminates the above problems involving the C-MOS construction.

As described in the foregoing, it is apparent that a striking improvement can be obtained when applying the present invention to electronic watches.

We claim:

1. In an electronic timepiece:
   an oscillator circuit for generating a periodic time standard signal;
   pulse generating means receptive of the periodic time standard signal for dividing the same and for generating pulse output signals;
   a stepping motor having a rotor, a stator and a coil;
   a drive circuit responsive to one of the pule output signals from said pulse generating means and responsive to control signals for normally applying driving current pulses of a particular pulse width to the coil of said stepping motor for driving said rotor;
   detecting means for applying a detection pulse to the coil of said stepping motor after a driving current pulse has been applied to said coil and for sensing a coil current in response to the applied detection pulse to determine whether or not said rotor had rotated in response to the previously applied driving current pulse; and
   control means cooperative with said detecting means and receptive of the pulse output signals from said pulse generating means for applying a control signal to said drive circuit to control said drive circuit to apply a correction pulse having a pulse width greater than that of the driving current pulse width to said motor coil and for thereafter applying a control signal to said drive circuit to resume applying the drive current pulses of said particular pulse width to said motor coil.

2. An electronic timepiece according to claim 1, wherein said detection means is effective for applying a detection pulse to said motor coil after a correction pulse has been applied to said motor coil and for sensing a coil current in response to the applied detection pulse to determine whether or not said rotor has rotated in response to the previously applied correction pulse; and
said control means is effective for applying to said motor coil another correction pulse having a pulse width greater than that of the previously applied correction pulse and for thereafter applying a control signal to said drive circuit to resume applying the drive current pulses of said particular pulse width to said motor coil.

3. An electronic timepiece according to claim 1, wherein said stator of said stepping motor is comprised of a single piece stator having an opening therethrough for receiving said rotor, the opening through said single piece stator being bounded by narrow magnetically saturable sections which when saturated effectively magnetically decouple said single piece stator into two stator sections of opposite polarity, and the opening through said single piece stator being bounded by surfaces on opposite sides of said narrow magnetically saturable sections which define stator magnetic pole surfaces of opposite magnetic polarity when said narrow magnetically saturable sections of said stator are magnetically saturated,
said motor coil is magnetically coupled with said single piece stator for magnetizing said single piece stator in response to the driving current pulses applied to said motor coil,
said rotor is positioned within the opening through said single piece stator, having permanent magnetic poles and magnetically coupling with said stator magnetic pole faces for rotation in response to changes in magnetic polarity of said stator magnetic pole faces,
wherein the relative positions of said rotor magnetic poles and said stator magnetic pole faces determine a time constant value for saturating said narrow magnetically saturable sections of said stator; and
wherein said detecting means is effective for applying a narrow electrical detection pulse to said motor coil, for sensing a current which flows through said motor coil in response to the narrow detection pulse, and for developing an output signal indicating that said rotor did not rotate in response to a previously applied driving current pulse if the current which flows through said motor coil in response to said detection pulse exceeds a certain predetermined value before the detection pulse terminates.

4. An electronic timepiece according to claim 1, wherein said detecting means includes:
a resistor connected in series with said rotor coil;
controllable switching means having a conductive and a non-conductive state and connected in parallel with said resistor for short-circuiting said resistor when said switching means is conductive;
switching control means for normally controlling said switching means to remain conductive when driving current pulses and correcting pulses are applied to said motor coil and for controlling said switching means to remain non-conductive while a detection pulse is applied to said motor coil so that the current which flows through said motor coil in response to the detection pulse flows through said resistor in series with said motor coil to develop a voltage drop across said resistor corresponding to the current flowing through said motor coil; and
voltage sensing means for sensing the voltage drop across said resistor when said switching means is non-conductive and a current flows through said resistor and for developing an output signal when the voltage drop across said resistor exceeds a certain value.

5. An electronic timepiece according to claim 4, wherein said resistor has a value in the range from about 7.1 KΩ to about 29 KΩ.

6. An electronic timepiece according to claim 4, wherein said control means and said detection means including said resistor comprise an integrated circuit.

7. An electronic timepiece according to claim 4, wherein said motor coil has a diameter of approximately 0.23 millimeters, approximately 10,000 turns and a series resistance of approximately 3 KΩ, said rotor has a diameter of approximately 1.3 millimeters, and said narrow saturable portions of said stator having a width of approximately 0.1 millimeters.

8. An electronic timepiece:
an oscillator circuit for generating a periodic time standard signal;
pulse generating means receptive of the periodic time standard signal for dividing the same and for generating a plurality of output pules each comprising a sequence of pulses of respectively different pulse widths;
a stepping motor including a stator, a rotor, means defining a rest position of said rotor and a coil for magnetizing said stator, said rotor having a preferred direction of rotation determined by the relative positioning of magnetic poles of said rotor and magnetic poles of said stator when said rotor is in the rest position, said motor coil exhibiting a first current verses time characteristic when a driving current flows through said motor coil in a direction effective to rotate said rotor in the preferred direction of rotation and said motor coil exhibiting a second current verses time characteristic having a greater time constant than the first current verses time characteristic when a driving current flows through said motor coil in a direction effective to rotate said rotor opposite the preferred direction of rotation;
control means responsive to a detection signal and receptive of the pulse output signals from said pulse generating means for applying a control signal to said drive circuit to control said drive circuit to apply a correction pulse to said motor coil having a polarity effective to rotate said rotor in the preferred direction each time the detection signal is received, said control means effective for applying correction pulses having successively longer pulse widths in response to each detection signal; and
detecting means for applying a detection pulse to the coil of said stepping motor after a driving current pulse has been applied to said control and for generating a detection signal when a coil current which flows in response to the detection pulse exhibits a current verses time characteristic indicative of non-rotation of said rotor in response to the previously applied driving current pulse and for subsequently applying a detection pulse after each correction pulse until a current flowing through said motor coil exhibits a current verses time characteristic indicative of rotation of said rotor in response to the previously applied correction pulse.

9. In an electronic timepiece according to claim 8, wherein said detecting means is effective for applying a detection pulse having the same polarity as a previously applied driving current pulse or correcting pulse and said detecting means is effective for generating a detection signal when a coil current flowing in response to said detection pulse exhibits the first current verses time characteristic.

10. An electronic timepiece, comprising:
an oscillator circuit for generating a periodic time standard signal;
pulse generating means receptive of the periodic time standard signal for dividing the same and for generating a plurality of output pulse signals each comprising a sequence of pulses of respectively different pulse widths;
a stepping motor including a rotor, a stator and a coil for magnetizing said stator;
means, comprised of a resistor and a semiconductor switching element connected in parallel, connected in series with said motor coil for receiving current flowing in said motor coil through said resistor when said semiconductor switching element is non-conductive and for receiving current flowing in said motor coil through said semiconductor switching element when said semiconductor switching element is conductive;
a drive circuit responsive to one of the pulse output signals from said pulse generating means and responsive to control signals for normally applying driving current pulses of a particular pulse width to said motor coil;
testing means for rendering said semiconductor switching element conductive after a driving current has been applied to said motor coil and for flowing a test current through said motor coil and through said resistor while said semiconductor switching element is conductive;
means for sensing the amplitude of a voltage drop across said resistor developed in response to the test current and for developing an output signal if the voltage drop indicates that said rotor failed to rotate in response to a previously applied driving current pulse; and
control means responsive to the output signal of said means for sensing for applying a control signal to said drive circuit effective to control said drive circuit to apply a sequence of successively broader correcting pulses to said motor coil until said rotor rotates;
wherein said resistor, said semiconductor switching element, said means for sensing, said testing means and said control means together comprise an integrated circuit.

11. An electronic timepiece according to claim 9; wherein said circuit means includes means responsive to the detection of non-rotation of the rotor for applying driving pulses of successively greater effective powers to the driving coil.

12. In an electronic timepiece of the type having a stepping motor having a rotor and driving coil: pulse generating means for periodically generating a normal driving pulse and a plurality of different kinds of correction driving pulses each having an effective power different than the others for effecting rotation of the rotor under different conditions; and means for applying a normal driving pulse to the driving coil during successive predetermined periods to effect rotation of the rotor and for detecting within each period whether or not the rotor has rotated in response to the applied normal driving pulse and if not, successively applying within the same period correction driving pulses of successively greater effective powers to the driving coil until the rotor rotates.

13. An electronic timepiece according to claim 12; wherein the last-mentioned means includes detecting means for detecting during each period whether or not the rotor has rotated in response to each of the applied normal and correction driving pulses.

14. An electronic timepiece according to claim 13; wherein said last-mentioned means includes pulse applying means for applying a normal driving pulse to the driving coil during successive predetermined periods and coacting with said detecting means for successively applying to the driving coil, during each period in which the applied normal driving pulse does not effect rotation of the rotor, correction driving pulses of successively greater effective powers until the rotor rotates.

15. An electronic timepiece according to claim 14; wherein said detecting means comprises a circuit comprised of a resistor and switching element connected in parallel, and means connecting said circuit in series with the driving coil.

16. An electronic timepiece according to any one of claims 12, 13, 14 and 15; wherein the normal driving pulses have a predetermined pulse width corresponding to a given effective power, and the different kinds of correction driving pulses have different respective pulse widths of successively longer durations than said predetermined pulse width corresponding to successively greater effective powers than said given effective power.

17. A method for driving a stepping motor incorporated in an electronic timepiece comprising the steps of: providing an electronic timepiece having an oscillator circuit, pulse generating means connected to said oscillator circuit, a drive circuit connected to said pulse generating means and to a control circuit, a stepping motor including a rotor, stator and coil driven by said drive circuit, and a detection circuit connected to said stepping motor; generating a periodic time standard signal in said oscillator circuit; dividing said periodic time standard signal and generating a plurality of output pulses each having a different pulse duration in said pulse generating means; applying an output pulse having a predetermined pulse duration to said drive circuit; applying a driving current pulse having a pulse duration corresponding to said predetermined pulse duration to the motor coil in response to said output pulse; detecting thereafter whether the rotor has rotated or not by the applied driving current pulse and producing an output signal if said rotor has not rotated; applying an output pulse having a pulse duration longer than said predetermined pulse duration to said drive circuit in response to said output signal from said detection circuit; repeating the last two steps with output pulses having successively longer pulse durations in response to successive output signals from said detection circuit until said detection circuit detects the rotation of said rotor; and returning thereafter to the step of applying said output pulse having said predetermined pulse duration to said drive circuit.

18. In an electronic timepiece of the type having a stepping motor having a rotor and driving coil: pulse generating means for periodically generating a plurality of different driving pulses of predetermined successively greater effective powers for effecting rotation of the rotor under different conditions; detecting means including a resistor and switching element connected in parallel with the parallel connection connected in series with the driving coil for detecting whether or not the rotor has rotated after the application of the driving pulses to the driving coil; and circuit means for applying driving pulses of minimum effective power to the driving coil during successive predetermined periods and responsive to the detection of non-rotation of the rotor by said detecting means for applying at least one driving pulse of effective power greater than said minimum effective power to the driving coil during the same period in which non-rotation of the rotor was detected.

19. An electronic timepiece according to claim 18; including means operative during each successive predetermined period for switching said switching element to one switching state to thereby connect said resistor in series with the driving coil to enable detection of whether or not the rotor has rotated and for switching said switching element to another switching state to thereby disconnect said resistor from the driving coil.

20. An electronic timepiece according to claim 19; wherein said means operative during each successive predetermined period includes means for switching said switching element to said another switching state during the time driving pulses are applied to the driving coil.

21. An electronic timepiece according to any one of claims 18, 19, 20; wherein the different driving pulses have different respective pulse widths of successively longer durations corresponding to successively greater effective powers.

22. A method for driving a stepping motor incorporated in an electronic timepiece comprising the steps of: providing an electronic timepiece having an oscillator circuit, pulse generating means connected to said oscillator circuit, a drive circuit connected to said pulse generating means and to a control circuit, a stepping motor including a rotor, stator and coil driven by said drive circuit, and a detection circuit comprised of a resistor and a switching element connected in parallel with the detection circuit connected in series with said coil; generating a periodic time standard signal in said oscillator circuit; dividing said periodic time standard signal and generating a plurality of output pulses each having a different pulse duration in said pulse generating means; applying an output pulse having a predetermined pulse duration to said drive circuit every second; applying a driving current pulse having a pulse duration corresponding to said predetermined pulse duration to the motor coil in response to said output pulse; by-passing the motor coil current through said switching element during said predetermined pulse duration by rendering said switching element conductive in response to said output pulse from said pulse generating means so as to momentarily disconnect said resistor from said motor coil; rendering thereafter said switching element non-conductive so as to connect said resistor to said motor coil in series and, at the same time, sensing the amplitude of the voltage drop across said resistor so as to detect whether or not said rotor has rotated; generating an output signal if the voltage drop indicates that said rotor has not rotated; and applying an output pulse having a pulse duration longer than said predetermined pulse duration to said drive circuit in response to said output signal from said detection circuit so as to compensate for the previous non-rotation of said rotor before the next output pulse having said predetermined pulse duration is applied to said drive circuit.

* * * * *